UNITED STATES PATENT OFFICE.

RANDALL T. VAN VALKENBURG, OF RUSHVILLE, INDIANA, ASSIGNOR TO J. N. NEAL, OF MANISTEE, MICHIGAN.

METHOD OF PRODUCING A PUNCTURE-CLOSING COMPOUND FOR PNEUMATIC TIRES.

1,143,152.

Specification of Letters Patent. Patented June 15, 1915.

No Drawing. Application filed November 24, 1913. Serial No. 802,766.

*To all whom it may concern:*

Be it known that I, RANDALL T. VAN VALKENBURG, a citizen of the United States, residing at Rushville, in the county of Rush and State of Indiana, have invented certain new and useful Improvements in Methods of Producing a Puncture-Closing Compound for Pneumatic Tires; and I do declare the following to be a full, clear, and exact description of the invention, such as will enable others skilled in the art to which it appertains to make and use the same.

This invention relates to a method of producing a compound for closing leakages in rubber articles such as pneumatic tires whether arising from the porosity of the rubber or from punctures.

The object of the invention is to provide a method of producing a compound of this character which when constructed in accordance therewith will keep the fibers equally distributed at all times, thereby preventing balling of the fibers within the inner tube of a tire.

In carrying out this invention, the following ingredients in the proportions specified are thoroughly commingled before application to the tube, to wit: 4¾ pounds of asbestos; 5½ pounds of alabastine, which is the equivalent of four pounds of whiting and one pound of plaster of Paris; 2 pounds of flour; 1½ pounds of corn meal; 10 pounds of salt; 1 pound of pulverized charcoal; 1 pound of iron oxid, and 55 pounds of water.

All of the ingredients except the flour and meal are first thoroughly mixed and are then cooked by subjecting them to 235 degrees Fahrenheit which greatly assists the commingling of the ingredients and causes the asbestos to become thread-like and prevents the fibers thereof from bunching or balling up such as frequently occurs when raw materials are employed. After they have been cooked to the desired thickness, enough liquid is removed and combined with the flour and corn meal to make a thin paste, and this paste is then added to the mixture while boiling and thoroughly agitated whereby the flour and meal is thoroughly mixed with the other ingredients and the cooking thereof renders them adhesive which quality is imparted to the entire composition.

The asbestos employed provides fibers which are suspended in the solution and are designed to seal all punctures air tight. The alabastine forms a body for the solution and the flour and corn meal an adhesive binder. The salt prevents the compound from freezing and souring and the charcoal and iron oxid prevent caking or balling of the compound and retains the compound in fluid condition.

This compound, after being prepared as above set forth, is applied to the inner face of the inner tube of the tire and forms a viscid coating which closes the pores of the rubber, and in case of a puncture forms a plug. This compound may be introduced into a tire through the valve tube or otherwise in a quantity sufficient to thoroughly cover the interior wall at all portions, and it may be distributed by whirling the tire or in the ordinary rotation thereof while on a wheel, as ensues when riding. It will close any reasonable puncture owing to the fact that the passage of the air from the tire through the puncture produces suction which draws the asbestos fibers into the opening and closes the same air tight.

I claim as my invention:—

A method of producing a leak closing compound for tires which consists in mixing asbestos, alabastine, salt, pulverized charcoal, iron oxid, and water; then subjecting them to 235° Fahrenheit and cooking them until thick, then adding flour and corn meal to the mixture while boiling and thoroughly agitating it until it becomes an agglutinating mass.

In testimony whereof I have hereunto set my hand in presence of two subscribing witnesses.

RANDALL T. VAN VALKENBURG.

Witnesses:
R. S. STUNZ,
M. N. PIERCE.